US012693926B2

(12) United States Patent
Sathaye et al.

(10) Patent No.: US 12,693,926 B2
(45) Date of Patent: Jul. 28, 2026

(54) SELF-TAGGING

(71) Applicant: Dell Products L.P., Round Rock, TX (US)

(72) Inventors: Sumedh Sathaye, Austin, TX (US); Vinay Sawal, Fremont, CA (US); Ching-Yun Chao, Austin, TX (US); Jason Liu, Wellesley, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/627,118

(22) Filed: Apr. 4, 2024

(65) Prior Publication Data

US 2025/0315331 A1 Oct. 9, 2025

(51) Int. Cl.
*G06F 11/07* (2006.01)

(52) U.S. Cl.
CPC ...... *G06F 11/0775* (2013.01); *G06F 11/0772* (2013.01); *G06F 11/0793* (2013.01)

(58) Field of Classification Search
CPC ............. G06F 11/0775; G06F 11/0772; G06F 11/0793
See application file for complete search history.

(56) References Cited

U.S. PATENT DOCUMENTS

| | | | | |
|---|---|---|---|---|
| 7,080,058 | B1 * | 7/2006 | Upadhyayula | ....... H04N 1/6083 |
| 8,626,481 | B1 * | 1/2014 | Sundararajan | .......... G06F 30/33 |
| | | | | 703/13 |
| 10,922,423 | B1 | 2/2021 | Rungta et al. | |
| 10,944,561 | B1 | 3/2021 | Cahill et al. | |
| 11,023,598 | B2 | 6/2021 | Grand | |
| 11,108,780 | B2 | 8/2021 | Cohen | |
| 11,379,275 | B2 * | 7/2022 | Milliron | .............. G06F 11/3089 |
| 12,061,880 | B2 | 8/2024 | Chen | |
| 2005/0021977 | A1 | 1/2005 | Oberst | |
| 2007/0239397 | A1 * | 10/2007 | Bourne | ................... H04L 43/50 |
| | | | | 702/182 |
| 2007/0289024 | A1 | 12/2007 | Mohammed | |
| 2015/0379061 | A1 | 12/2015 | Paraschivescu | |
| 2016/0072814 | A1 | 3/2016 | Martinelli | |
| 2018/0349797 | A1 | 12/2018 | Garvey et al. | |
| 2020/0081992 | A1 | 3/2020 | Lynch et al. | |
| 2021/0084048 | A1 | 3/2021 | Kannan et al. | |
| 2021/0216053 | A1 * | 7/2021 | Boelk | .................... G05B 15/02 |

(Continued)

OTHER PUBLICATIONS

Chao, Ching-Yun. "Software Services with Declarative Resource Modeling and Resource Model Patterns" U.S. Appl. No. 18/048,669, filed Oct. 21, 2022, 47 pages.

(Continued)

*Primary Examiner* — Jigar P Patel
(74) *Attorney, Agent, or Firm* — Amin, Turocy & Watson, LLP

(57) ABSTRACT

A system can comprise a component and a component manager. The system can determine, by the component, an issue with execution of the component. The system can determine, by the component, a tag that corresponds to the issue. The system can send, by the component and to a tagging subsystem of the system, an application programming interface call that identifies changing a state tag value of the component to the tag. The system can issue, by the component manager, an action applicable to the system based on the state tag value.

20 Claims, 11 Drawing Sheets

(56)           References Cited

U.S. PATENT DOCUMENTS

| 2022/0093091 | A1 | 3/2022 | Kwatra et al. | |
| 2022/0207096 | A1 | 6/2022 | Salazar et al. | |
| 2022/0223143 | A1 | 7/2022 | Kumar et al. | |
| 2023/0086475 | A1 | 3/2023 | Mosko | |
| 2023/0192139 | A1* | 6/2023 | Kumavat | B60W 50/0098 |
| | | | | 701/25 |
| 2023/0401332 | A1 | 12/2023 | Vahidnia et al. | |
| 2024/0179181 | A1 | 5/2024 | Torlak et al. | |
| 2024/0179182 | A1 | 5/2024 | Hicks et al. | |
| 2024/0179188 | A1 | 5/2024 | Torlak et al. | |
| 2024/0249008 | A1 | 7/2024 | Inokuchi et al. | |
| 2025/0202903 | A1 | 6/2025 | Fry et al. | |

OTHER PUBLICATIONS

Chao, et al. "Scalable Access Control Mechanism" U.S. Appl. No. 17/932,905, filed Sep. 16, 2022, 51 pages.

Hu, et al. "Guide to Attribute Based Access Control (ABAC) Definition and Considerations" NIST Special Publication 800-162 [https://doi.org/10.6028/NIST.SP.800-162], Jan. 2014, 47 pages.

Ferraiolo, et al., "Extensible Access Control Markup Language (XACML) and Next Generation Access Control (NGAC)," ABAC '16: Proceedings of the 2016 ACM International Workshop on Attribute Based Access Control, Mar. 2016, 12 pages.

Ferraiolo, et al., "A Comparison of Attribute Based Access Control (ABAC) Standards for Data ServiceApplications" NIST SP 800-178, [http://dx.doi.org/10.6028/NIST.SP.800-178], Oct. 2016, 68 pages.

"Dell EMC OpenManage EnterpriseSupportAssist Version 1.1" [https://dl.dell.com/topicspdf/openmanage-enterprise-supportassist_users-guide2_en-us.pdf], Jun. 2021, 65 pages.

"Scopes" [https://auth0.com/docs/get-started/apis/scopes] retreived Nov. 3, 2023, 4 pages.

"Cortex XDR Pro Administrator Guide" [https://docs.paloaltonetworks.com/content/dam/techdocs/en_us/pdf/cortex/ cortex-xdr/cortex-xdr-pro-admin/cortex-xdr-pro-admin.pdf/cortex-xdr-pro-admin.pdf], retreived Nov. 3, 2023, 776 pages.

"Attribute Based Access Control" National Institute of Standards and Technology, [https://www.nccoe.nist.gov/sites/default/files/legacy-files/abac-fact-sheet.pdf], Sep. 2017, 2 pages.

"Hierarchical and recursive queries in SQL" Wikipedia. [https://en.wikipedia.org/wiki/Hierarchical_and_recursive_queries_in_SQL#Common_table_expression], retrieved Nov. 30, 2023, 5 pages.

Kivimaki, Petteri. "AWS, Azure, GCP: Resource Hierarchies" [https://levelup.gitconnected.com/aws-azure-gcp-resource-hierarchies-25b829127511] Feb. 9, 2020, 15 pages.

"Hierarchical Data in SQL: The Ultimate Guide" [https://www.databasestar.com/hierarchical-data-sql/] Jun. 2, 2023, 21 pages.

"What are the options for storing hierarchical data in a relational database?" [https://stackoverflow.com/questions/4048151/what-are-the-options-for-storing-hierarchical-data-in-a-relational-database], retrieved Nov. 3, 2023, 11 pages.

Monge, Alvaro. "Database design with UML and SQL, 4th edition" [https://web.csulb.edu/colleges/coe/cecs/dbdesign/dbdesign.php?page=intro.html], retrieved Nov. 3, 2023, 2 pages.

Fang, et al. "Attribute-Based Access Control Using Scoped Roles and Conditioned Permissions Dynamic Policies" U.S. Appl. No. 18/331,770, filed Jun. 8, 2023, 47 pages.

"Jabbar et al. ""Dynamic Visibility and Authorization Policymanagement for a Cloud Service Platform"" U.S. Appl. No. 18/350, 149, filed Jul. 11, 2023, 59 pages.".

"ACME Laboratories" [https://www.acme.com/], retrieved Dec. 1, 2023, 2 pages.

"Azure Policy definition structure" [https://learn.microsoft.com/en-us/azure/governance/policy/concepts/definition-structure], Aug. 15, 2023, 34 pages.

"Azure policyRule schema" [https://schema.management.azure.com/schemas/2020-10-01/policyDefinition.json], retrieved Dec. 1, 2023, 2 pages.

"Policy-based control for cloud native environments" Open Policy Agent. [https://www.openpolicyagent.org/], retrieved Dec. 1, 2023, 6 pages.

Goyal, et al. "Authorization Decisions Using Conditioned Permissions for Resource Collections" U.S. Appl. No. 18/364,939, filed Aug. 3, 2023, 53 pages.

Chao, et al. "Policy-Based Tagging Governance for Cloud Resource Lifecycle Management" U.S. Appl. No. 18/639,707, filed Apr. 18, 2024, 47 pages.

Sawal, et al. "Meta-Tagging Based Configuration Transformation for Heterogeneous Systems" U.S. Appl. No. 18/639,737, filed Apr. 18, 2024, 47 pages.

Courcelle, Bruno. "Graph equivalences and decompositions definable in Monadic Second-Order Logic. The case of Circle Graphs" presented at Proc. of ICDM, Jul. 24, 2006, 15 pages.

Thomas, Wolfgang. "Languages, Automata, and Logic" May 1996, In Handbook of Formal Languages, vol. 3: Beyond Words. New York NY: Springer-Verlag, 75 pages.

Office Action mailed Dec. 5, 2023 for U.S. Appl. No. 18/048,669, 27 pages.

Notice of Allowance mailed May 13, 2024 for U.S. Appl. No. 18/048,669, 33 pages.

Dasika, et al. "Data Center Monitoring and Management Operation Including a Data Tag Association Tracking Operation" U.S. Appl. No. 18/374,225, filed Sep. 28, 2023, 66 pages.

Guertin, et al. "Data Center Monitoring and Management Operation Including a Data Tag Management Operation" U.S. Appl. No. 18/241,030, filed Aug. 31, 2023, 73 pages.

Realegeno, et al. "User-Configurable Autotagging Policies" U.S. Appl. No. 18/241,040, filed Aug. 31, 2023, 71 pages.

Earley, et al. "Data Center Monitoring and Management Operation Including a Protected Data Tag Operation" U.S. Appl. No. 18/374,230, filed Sep. 28, 2023, 68 pages.

Sathaye, et al. "System and Methods for Dynamic Tags", U.S. Appl. No. 18/374,231, filed Sep. 28, 2023, 66 pages.

Office Action mailed Apr. 14, 2025 for U.S. Appl. No. 17/932,905, 52 pages.

Notice of Allowance mailed Apr. 10, 2025 for U.S. Appl. No. 18/331,770, 36 pages.

Notice of Allowance mailed Apr. 8, 2025 for U.S. Appl. No. 18/364,939, 44 pages.

Office Action mailed Nov. 3, 2025 for U.S. Appl. No. 18/639,737, 125 pages.

Notice of Allowance mailed Aug. 19, 2025 for U.S. Appl. No. 17/932,905, 66 pages.

Notice of Allowance mailed Mar. 18, 2026 for U.S. Appl. No. 18/639,737, 53 pages.

* cited by examiner

100

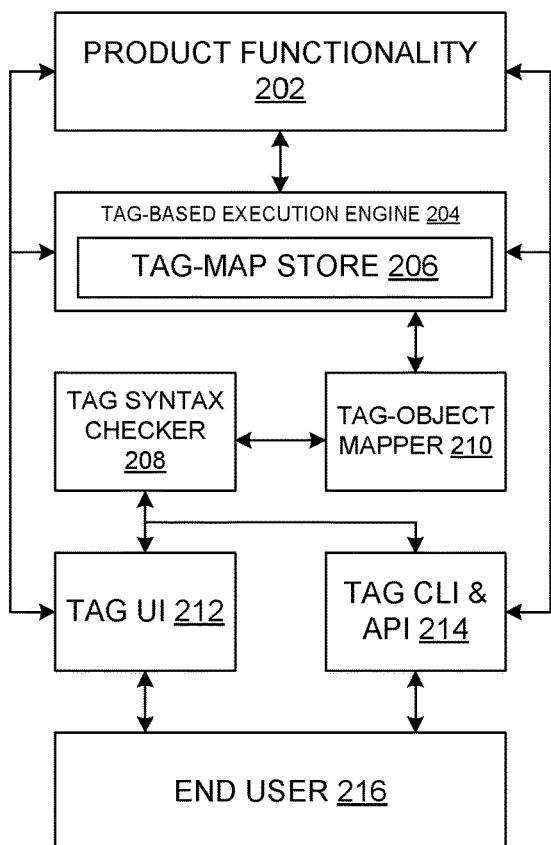
FIG. 2

400

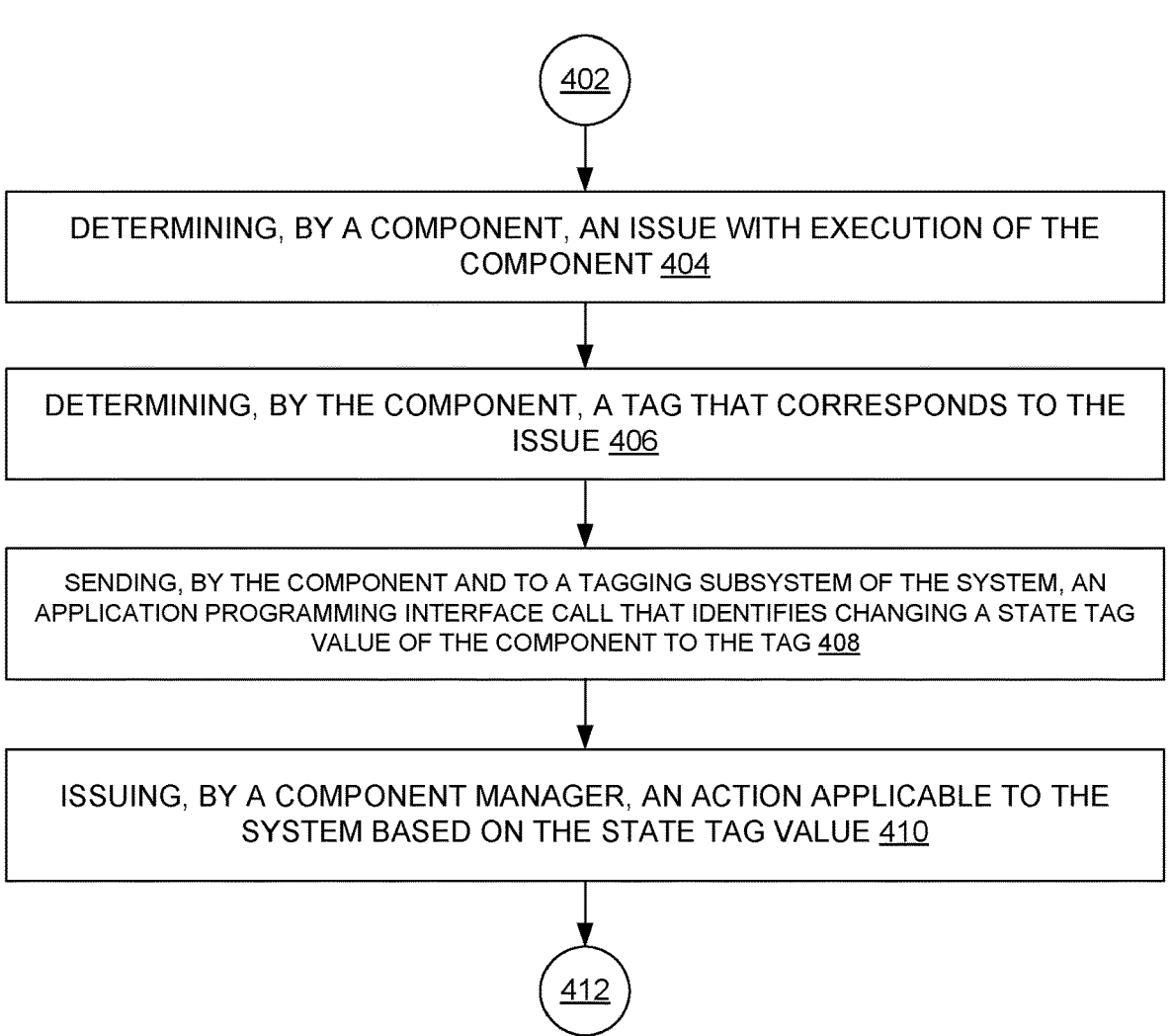

402

DETERMINING, BY A COMPONENT, AN ISSUE WITH EXECUTION OF THE COMPONENT 404

DETERMINING, BY THE COMPONENT, A TAG THAT CORRESPONDS TO THE ISSUE 406

SENDING, BY THE COMPONENT AND TO A TAGGING SUBSYSTEM OF THE SYSTEM, AN APPLICATION PROGRAMMING INTERFACE CALL THAT IDENTIFIES CHANGING A STATE TAG VALUE OF THE COMPONENT TO THE TAG 408

ISSUING, BY A COMPONENT MANAGER, AN ACTION APPLICABLE TO THE SYSTEM BASED ON THE STATE TAG VALUE 410

500

502

DETERMINING, BY A COMPONENT, AN ISSUE WITH EXECUTION OF THE COMPONENT 504

DETERMINING, BY THE COMPONENT, A TAG THAT CORRESPONDS TO THE ISSUE 506

DEPICTS SENDING, BY THE COMPONENT AND TO A TAGGING SUBSYSTEM, AN APPLICATION PROGRAMMING INTERFACE CALL THAT IDENTIFIES CHANGING A STATE TAG VALUE OF THE COMPONENT TO THE TAG 508

CAUSING, BY A COMPONENT MANAGER OF THE SYSTEM, AN ACTION TO BE PERFORMED ON THE SYSTEM BASED ON THE STATE TAG VALUE 510

TERMINATING, BY THE COMPONENT MANAGER, A FIRST INSTANCE OF THE COMPONENT 604

INSTANTIATING, BY THE COMPONENT MANAGER, A SECOND INSTANCE OF THE COMPONENT 606

608

700

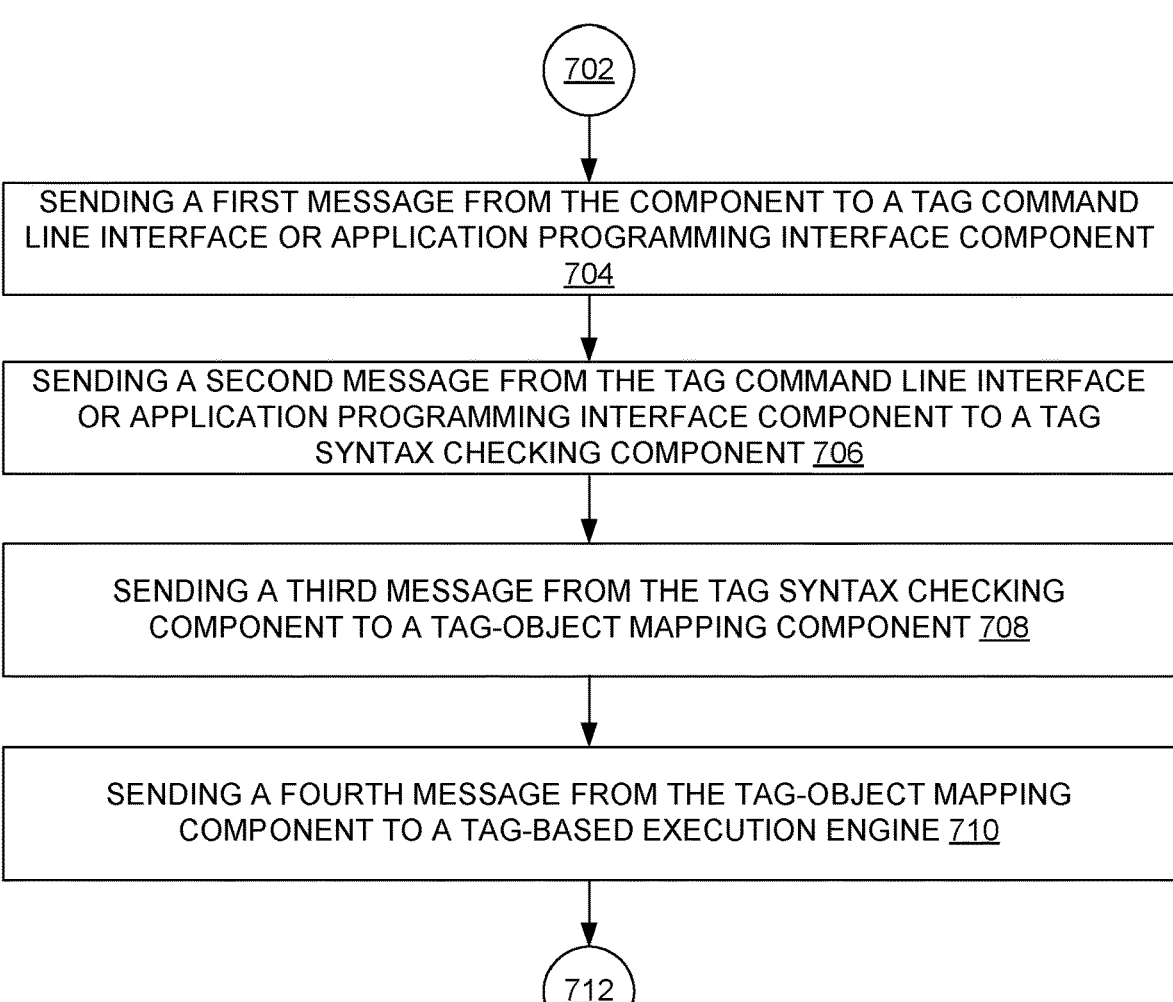

702

SENDING A FIRST MESSAGE FROM THE COMPONENT TO A TAG COMMAND LINE INTERFACE OR APPLICATION PROGRAMMING INTERFACE COMPONENT 704

SENDING A SECOND MESSAGE FROM THE TAG COMMAND LINE INTERFACE OR APPLICATION PROGRAMMING INTERFACE COMPONENT TO A TAG SYNTAX CHECKING COMPONENT 706

SENDING A THIRD MESSAGE FROM THE TAG SYNTAX CHECKING COMPONENT TO A TAG-OBJECT MAPPING COMPONENT 708

SENDING A FOURTH MESSAGE FROM THE TAG-OBJECT MAPPING COMPONENT TO A TAG-BASED EXECUTION ENGINE 710

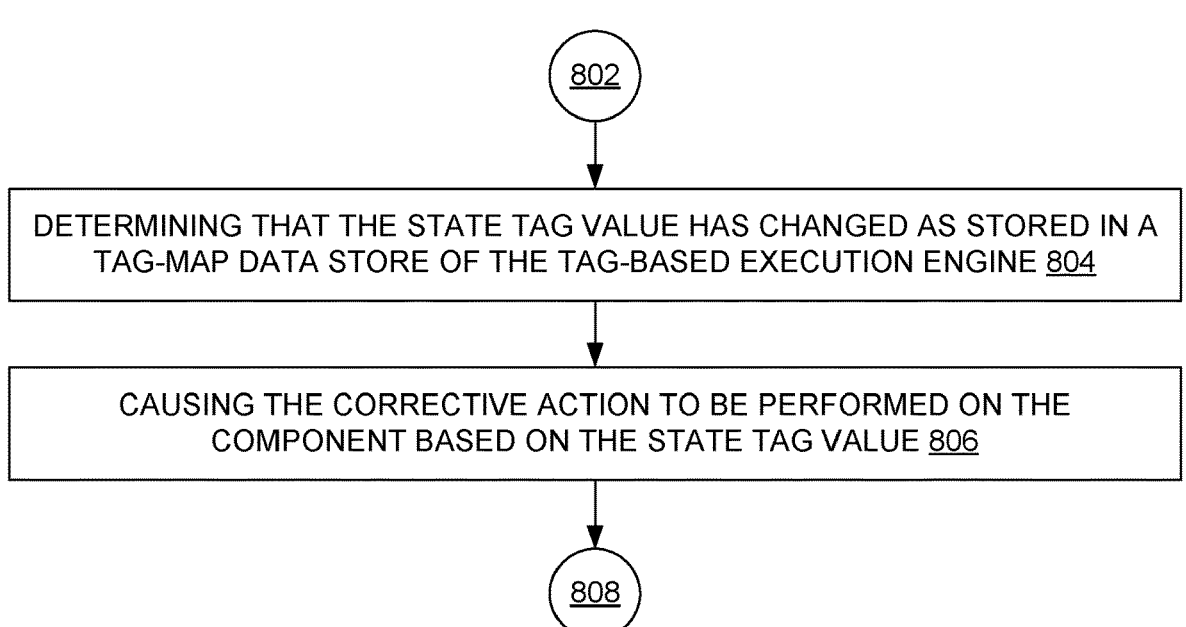
DETERMINING THAT THE STATE TAG VALUE HAS CHANGED AS STORED IN A TAG-MAP DATA STORE OF THE TAG-BASED EXECUTION ENGINE 804
CAUSING THE CORRECTIVE ACTION TO BE PERFORMED ON THE COMPONENT BASED ON THE STATE TAG VALUE 806
FIG. 8

900

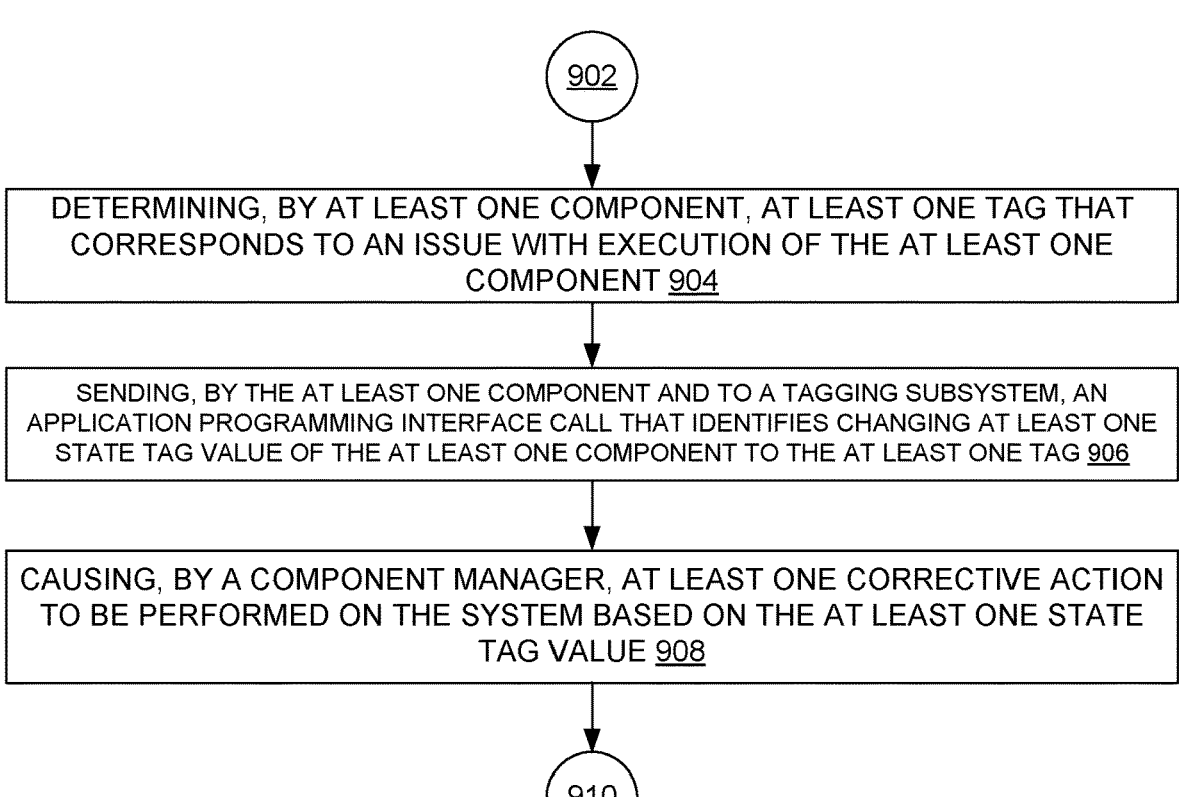

902

DETERMINING, BY AT LEAST ONE COMPONENT, AT LEAST ONE TAG THAT CORRESPONDS TO AN ISSUE WITH EXECUTION OF THE AT LEAST ONE COMPONENT 904

SENDING, BY THE AT LEAST ONE COMPONENT AND TO A TAGGING SUBSYSTEM, AN APPLICATION PROGRAMMING INTERFACE CALL THAT IDENTIFIES CHANGING AT LEAST ONE STATE TAG VALUE OF THE AT LEAST ONE COMPONENT TO THE AT LEAST ONE TAG 906

CAUSING, BY A COMPONENT MANAGER, AT LEAST ONE CORRECTIVE ACTION TO BE PERFORMED ON THE SYSTEM BASED ON THE AT LEAST ONE STATE TAG VALUE 908

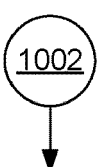

CHANGING THE FIRST STATE TAG VALUE OF THE FIRST COMPONENT TO THE AT LEAST ONE TAG, OR CHANGING A SECOND STATE TAG VALUE OF A THIRD COMPONENT OF THE AT LEAST ONE COMPONENT 1004

PERFORMING AT LEAST ONE ACTION ON A SECOND COMPONENT OF THE AT LEAST ONE COMPONENT BASED ON CHANGING THE FIRST STATE TAG VALUE OF THE FIRST COMPONENT TO THE AT LEAST ONE TAG, OR BASED ON CHANGING A SECOND STATE TAG VALUE OF A THIRD COMPONENT OF THE AT LEAST ONE COMPONENT 1006

PROCESSING UNIT — 1104

1108    1106

SYSTEM MEMORY — 1112

RAM

ROM — 1110

1124

INTERFACE

HDD — 1114

1126

INTERFACE

EXTERNAL STORAGE — 1116

1128

INTERFACE

OPTICAL DRIVE — 1120

DISK — 1122

MONITOR — 1146

VIDEO ADAPTOR — 1148

(WIRED/WIRELESS)

KEYBOARD — 1138

TOUCH SCREEN — 1140

MOUSE — 1142

INPUT DEVICE INTERFACE — 1144

MODEM — 1160

WAN — 1156

REMOTE COMPUTER(S) — 1150

NETWORK ADAPTOR — 1158

LAN — 1154

(WIRED/WIRELESS)

MEMORY/ STORAGE — 1152

1130 — OPERATING SYSTEM

1132 — APPLICATIONS

1134 — MODULES

1136 — DATA

SELF-TAGGING

BACKGROUND

A computer system can comprise various components, which can have various statuses.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a component and a component manager. The system can determine, by the component, an issue with execution of the component. The system can determine, by the component, a tag that corresponds to the issue. The system can send, by the component and to a tagging subsystem of the system, an application programming interface call that identifies changing a state tag value of the component to the tag. The system can issue, by the component manager, an action applicable to the system based on the state tag value.

An example method can comprise determining, by a component of a system comprising at least one processor, an issue with execution of the component. The method can further comprise determining, by the component, a tag that corresponds to the issue. The method can further comprise sending, by the component and to a tagging subsystem of the system, an application programming interface call that identifies changing a state tag value of the component to the tag. The method can further comprise causing, by a component manager of the system, an action to be performed on the system based on the state tag value.

An example non-transitory computer-readable medium can comprise instructions that, in response to execution, cause a system comprising a processor to perform operations. These operations can comprise determining, by the at least one component, at least one tag that corresponds to an issue with execution of the at least one component. These operations can further comprise sending, by the at least one component and to a tagging subsystem, an application programming interface call that identifies changing at least one state tag value of the at least one component to the at least one tag. These operations can further comprise causing, by a component manager, at least one corrective action to be performed on the system based on the at least one state tag value.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates another example system architecture that can facilitate self-tagging, in accordance with an embodiment of this disclosure;

FIG. 4 illustrates an example process flow that can facilitate self-tagging, in accordance with an embodiment of this disclosure;

FIG. 5 illustrates another example process flow that can facilitate self-tagging, in accordance with an embodiment of this disclosure;

FIG. 7 illustrates another example process flow that can facilitate self-tagging, in accordance with an embodiment of this disclosure;

FIG. 8 illustrates another example process flow that can facilitate self-tagging, in accordance with an embodiment of this disclosure;

FIG. 9 illustrates another example process flow that can facilitate self-tagging, in accordance with an embodiment of this disclosure;

FIG. 10 illustrates another example process flow that can facilitate self-tagging, in accordance with an embodiment of this disclosure;

DETAILED DESCRIPTION

Overview

Figure 1:
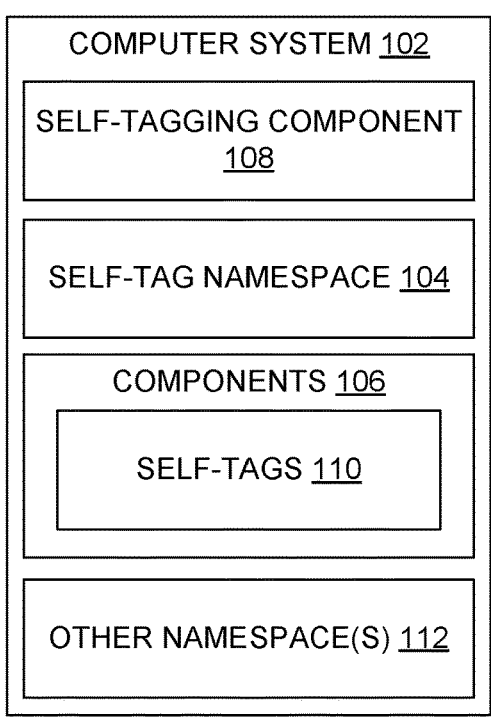
FIG. 1 illustrates an example system architecture that can facilitate self-tagging, in accordance with an embodiment of this disclosure.

An example computer system can comprise a large number of components, such as pods/containers, virtual machines (VMs), host operating systems (OSes), volumes, file systems, object store buckets, server hardware, storage arrays, software defined storage (SDS) systems, etc.

Prior approaches to tagging these components can be based on a centralized approach. A tagging subsystem can provide interfaces to users and agents to define and associate tags. These users and agents can be external to the computer system. Where auto-tagging is performed based on system behavior profile, trends, profiles, etc., this can still be an outside-in technique according to prior approaches. A tagging subsystem can provide functions to describe behavior changes based on tags once they are associated.

According to the present techniques, self-tagging can comprise facilitating system components, objects, resources, and other artefacts in defining and attaching tags to themselves. This can be different from auto-tagging where a tagging subsystem (rather than the component, etc., itself) determines the tags to attach to objects in the system.

According to the present techniques, a programmer/creator of a component can have leeway to define new tags for a component, create new tags as determined appropriate during a lifecycle of the component, and self-attach a tag to a running instance of the component.

A centralized tagging system can be effective in correctly determining a static behavior. However, a component can have dynamic runtime knowledge and state awareness that a centralized subsystem can lack.

For example, a pod/container can reach a failure state—the code can determine when a "divide by 0" exception happens. The pod/container's exception handler can catch the exception. The exception handler can set flags on to itself in the form of self-tags, such as "component1State=failure"

and "component1Failure=DivBy0Exception." A system that implements the present techniques can set "watchers" on the self-tags, and initiate remedial actions based on the tag key, its expected values, and/or new values that can be new to the system. This approach can reduce a burden on observer processes that watch for failed computation, and initiate remedial actions.

This can operate as a mechanism for component communication. For instance, a component can communicate with the rest of a computer system to obtain a service it requests, affect behavior of other components, etc. Because of the tags, a component creator can have freedom to define and use new semantics.

A component can provide a set of actions that it expects an overall system to take. When a component attaches a self-tag, it can make a stored-procedure available for the system to execute. The procedure can use run-time values of its parameters, based on conditions that a component is operating in at that time.

Self-tagging can comprise a technique to facilitate system components in communicating with the rest of the system. Self-tags can belong to a separate category of tags, separate from system internal tags, or user-defined tags. Self-tags can be managed in a separate namespace, by virtue of that separation.

Self-tags can be used as an approach to solve a problem of how components of a system can communicate back with the rest of the system.

The present techniques can be implemented to facilitate a tagging-based approach for setting status of a component and/or otherwise communicating with the rest of the system. In some examples, components can define their own tag namespace, and have the rest of the system recognize the namespace as such, and use it for causing a desired state change in the system.

A namespace for self-tags can be separate from a namespace of system internal tags of a system and user-defined tags.

Self-tagging can be complementary to a policy/rule-based system. Once self-tagging is implemented, any component of the system can use the policy/rule-based system, thus extending the ability of a component architect/programmer to set policies, dynamically change policies based on run-time conditions, and generally take advantage of a policy-based system.

In addition, in some examples, actions for self-tags can be defined, specified, and loaded along with a creation and setting of self-tags.

Example Architectures, Etc.

FIG. 1 illustrates an example system architecture 100 that can facilitate self-tagging, in accordance with an embodiment of this disclosure.

System architecture 100 comprises computer system 102, self-tag namespace 104, components 106, self-tagging component 108, self-tags 110, and other tag namespace(s) 112.

System architecture 100 presents one logical example of implementing the present techniques, and it can be appreciated that there can be other example architectures.

Figure 11:
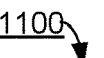
FIG. 11 illustrates an example block diagram of a computer operable to execute an embodiment of this disclosure.

Computer system 102 can be implemented with part(s) of computing environment 1100 of FIG. 11.

Computer system 102 can comprise components 106, which can be computer components, and which can each be tagged with one or more tags of self-tags 110. These can be self-tags as described herein, and can have their own namespace, noted by self-tag namespace 104. Self-tag namespace 104 can be separate from other namespaces, noted here as other namespace(s) 112.

In some examples, self-tagging component 108 can facilitate self-tagging of components 106 with self-tags 110.

In some examples, self-tagging component 108 can implement part(s) of the process flows of FIGS. 4-10 to implement self-tagging.

It can be appreciated that system architecture 100 is one example system architecture for self-tagging, and that there can be other system architectures that facilitate self-tagging.

FIG. 2 illustrates another example system architecture 200 that can facilitate self-tagging, in accordance with an embodiment of this disclosure. In some examples, part(s) of system architecture 200 can be used to implement part(s) of system architecture 100 of FIG. 1 to facilitate self-tagging.

System architecture 200 comprises product functionality 202, tag-based execution engine 204, tag-map store 206, tag syntax checker 208, tag-object mapper 210, tag UI 212, tag CLI & API 214, end user 216, and self-tagging component 218 (which can be similar to self-tagging component 108 of FIG. 1).

A system that implements tagging functionality can comprise, a tag user interface (UI), command line interface (CLI), or application programming interface (API) by with an end user can interact with the system. The tag UI can comprise a graphical user interface (GUI) for tag create, read, update, and delete (CRUD) and mapping operations. The tag CLI and API can comprise a command-line and API interface to tag CRUD and mapping operations.

A tag syntax checker can ensure that tags are defined to meet system tag syntax requirements. A tag-object mapper can map tags to system objects. A tag-map store can comprise a database (DB) that indexes, stores, retrieves, and supplies tags and their mapping to objects. A tag-based executing engine can operate on product functions to perform tag-based operations.

Figure 3:
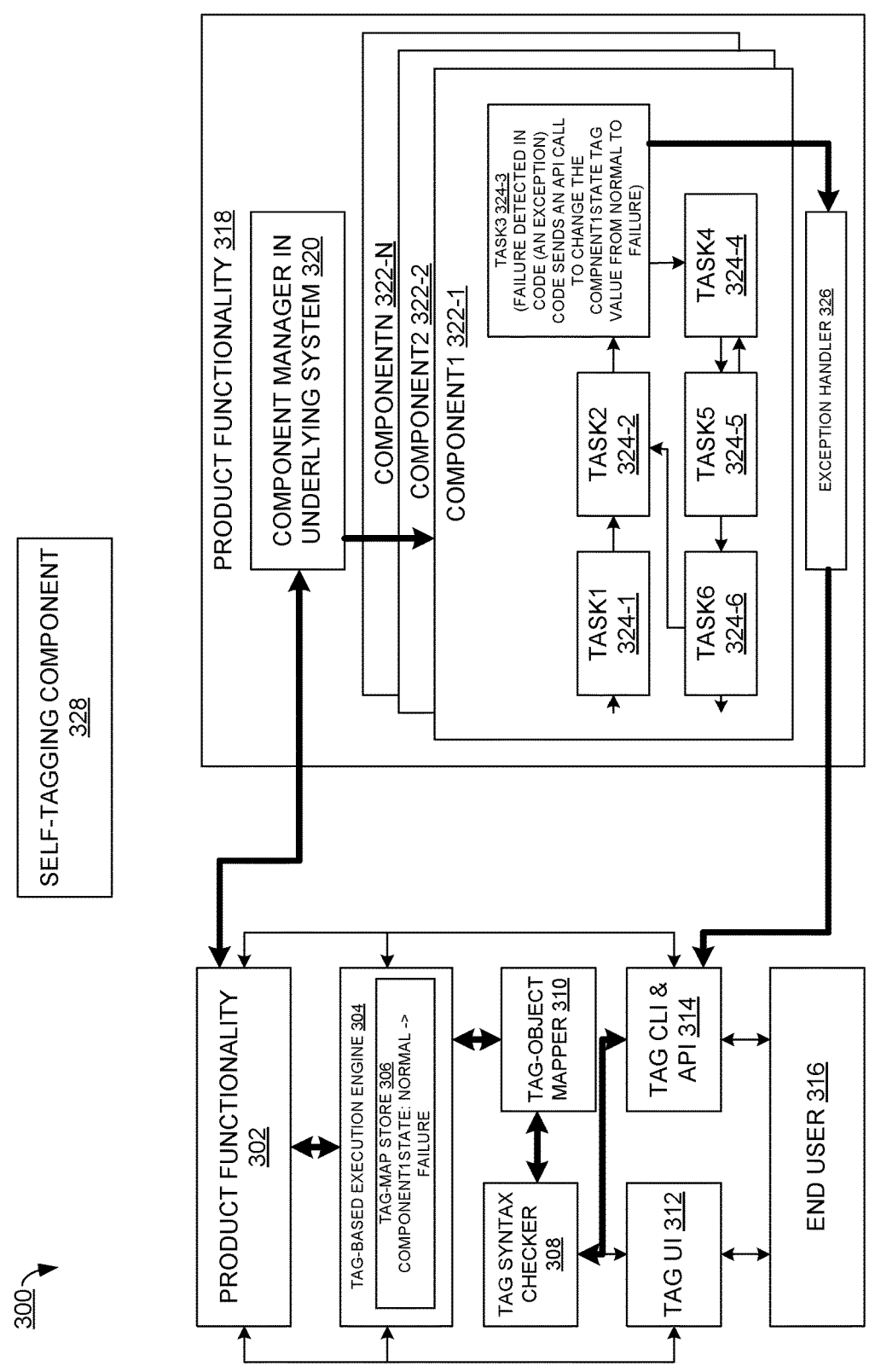
FIG. 3 illustrates another example system architecture that can facilitate self-tagging, in accordance with an embodiment of this disclosure.

FIG. 3 illustrates another example system architecture 300 that can facilitate self-tagging, in accordance with an embodiment of this disclosure. In some examples, part(s) of system architecture 300 can be used to implement part(s) of system architecture 100 of FIG. 1 to facilitate self-tagging.

System architecture 300 comprises tag-based execution engine 304, tag-map store 306, tag syntax checker 308, tag-object mapper 310, tag UI 312, tag CLU & API 314, end user 316, product functionality 318, component manager in underlying system 320, component1 322-1, component2 322-2, componentN 322-N, task1 324-1, task2 324-2, task3 324-3, task4 324-4, task5 324-5, task6 324-6, exception handler 326, and self-tagging component 328 (which can be similar to self-tagging component 108 of FIG. 1).

In some examples, tag-based execution engine 304, tag-map store 306, tag syntax checker 308, tag-object mapper 310, tag UI 312, tag CLU & API 314, and end user 316 can be similar to tag-based execution engine 204, tag-map store 206, tag syntax checker 208, tag-object mapper 210, tag UI 212, tag CLI & API 214, and end user 216 of FIG. 2, respectively.

System architecture 300 comprises multiple components, where each component has a capability to enhance itself by including in its own logic the ability to (CRUD) tags in the whole system. This is illustrated in Component1, where the logic is shown as a task-flow graph. Task3 comprises logic where, when Component1 is performing normally, it tags myState=Normal to indicate normal operation. Then, when Task3 encounters an exception condition, it can send out a call to change the myState value to Failure.

This call can be handled by the tagging subsystem. The tagging subsystem can modify the tag, and update the tag-map store. An update of the tag can trigger the component manager in the system to initiate tag-based actions. For example, where Component1 is now in known-failed state, actions such as restart, kill, and quarantine can be taken based on failure handling policies for the system.

These techniques can be generalized for handling of different kinds of events in addition to exceptions. Additionally, tags can be generalized, actions can be generalized, and expected effects can also be generalized.

Other applications of the present techniques can be as follows. Consider a scenario where there is an existing system tag. System behavior can be changed where actions based on that tag are initiated—from default—or there is a tag that was created by another component. That tag can be used, and a behavior can be defined to be a part of a new pool of functions.

Consider another scenario that involves scaling up or scaling down as storage capacity is reduced. This can be announced to other parts of a system, and self-tagging can be used for the announcement.

In FIG. 3, bolded lines indicate a flow between components for self-tagging. Task3 324-3 can identify an exception, and pass it to exception handler 326. Exception handler 326 can notify tag CLI & API 314 (such as via POST commands—POST/v1/Tag/comopnnet1State=Failure and POST/v1/Tag/component1Failure=DivBy0Exception). The signaling can go from CLI & API 314 through tag syntax checker 308 and tag-object mapper 310, to tag-based execution engine 304. Tag-based execution engine 304, can update a tag for task3 324-3 in tag-map store 306.

For instance, the tag can be updated from component1state=Normal to component1State=Failure.

Tag-based execution engine 304 can also notify component manager in underlying system 320, which can initiate a corrective action (e.g., kill an instance of task3 324-3, and start a new instance in its place). In this manner, task3 324-3 can perform self-tagging of itself, and this self-tag can be used by the greater system.

Example Process Flows

FIG. 4 illustrates an example process flow 400 that can facilitate self-tagging, in accordance with an embodiment of this disclosure. In some examples, one or more embodiments of process flow 400 can be implemented by self-tagging component 108 of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404.

Operation 404 depicts determining, by a component, an issue with execution of the component.

After operation 404, process flow 400 moves to operation 406. This can comprise identifying that there is an issue with executing a component (e.g., an exception is thrown during execution).

In some examples, the component comprises a pod, a container, a virtual machine, a host operating system, a volume, a file system, an object storage bucket, a computer hardware, or a storage array. That is, a system can comprise a variety of components, and self-tagging can be implemented with a variety of components.

Operation 406 depicts determining, by the component, a tag that corresponds to the issue.

This can comprise identifying a tag for that issue, and can be performed by the component for which there is an issue—e.g., self-tagging.

In some examples, the determining of the tag is performed independently of the tagging subsystem. That is, self-tagging can be performed, which can facilitate system components, objects, resources, and other artefacts, in defining and attaching tags to themselves. This can be different from auto-tagging, in which a tagging system can determine on its own which tags to attach to objects in the system.

In some examples, the tag is defined based on tag data that is provided by a developer of the component. That is, according to the present techniques, a programmer/creator of a component can have leeway to define new tags for a component, create new tags as determined appropriate during a lifecycle of the component, and self-attach a tag to a running instance of the component.

In some examples, the determining of the tag is performed based on dynamic runtime knowledge of the component that is available to the component and that is unavailable to the tagging subsystem. In some examples, the determining of the tag is performed based on state information of the component that is available to the component and that is unavailable to the tagging subsystem. That is, self-tagging by a component can be performed where the component can have dynamic runtime knowledge and state awareness that a centralized subsystem can lack.

After operation 406, process flow 400 moves to operation 408.

Operation 408 depicts sending, by the component and to a tagging subsystem of the system, an application programming interface call that identifies changing a state tag value of the component to the tag.

That is, the component can send that tag to a tagging subsystem, where the tagging subsystem can update a state tag value based on the tag.

After operation 408, process flow 400 moves to operation 410.

Operation 410 depicts issuing, by a component manager, an action applicable to the system based on the state tag value.

That is, an action can be performed on the component, or another part of a system that hosts the component based on the new state tag value. In some examples, self-tagging can be used for a variety of actions, be that on the component itself, one or more other components, or the entire system.

For example, beyond changing a state of a tag value component, new tags could be created. This could be a new tag that the system did not hitherto know about, but can now be used by components as a communication mechanism.

In some examples, the component comprises a stored procedure, and issuing the action comprises the component manager invoking the stored procedure for the component. In some examples, invoking the stored procedure comprises the stored procedure utilizing runtime values of the component. That is, when a component attaches a self-tag, it can make a stored-procedure available for the system to execute. The procedure can use run-time values of its parameters, based on conditions that a component is operating in at that time.

After operation 410, process flow 400 moves to 412, where process flow 400 ends.

FIG. 5 illustrates an example process flow 500 that can facilitate self-tagging, in accordance with an embodiment of this disclosure. In some examples, one or more embodiments of process flow 500 can be implemented by self-tagging component 108 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504.

Operation 504 depicts determining, by a component, an issue with execution of the component. In some examples, operation 504 can be implemented in a similar manner as operation 404 of FIG. 4.

In some examples, the issue with the execution of the component comprises an exception. For instance, this can be a "divide by zero" exception.

After operation 504, process flow 500 moves to operation 506.

Operation 506 depicts determining, by the component, a tag that corresponds to the issue. In some examples, operation 506 can be implemented in a similar manner as operation 406 of FIG. 4.

After operation 506, process flow 500 moves to operation 508.

Operation 508 depicts sending, by the component and to a tagging subsystem, an application programming interface call that identifies changing a state tag value of the component to the tag. In some examples, operation 508 can be implemented in a similar manner as operation 408 of FIG. 4.

In some examples, the application programming interface call adheres to a representational state transfer format, or a protocol buffer format. For example, using a representational state transfer (REST) format, the API call can be "POST/v1/Tag/comopnnet1State=Failure," or "POST/v1/Tag/component1Failure=DivBy0Exception."

After operation 508, process flow 500 moves to operation 510.

Operation 510 depicts causing, by a component manager of the system, an action to be performed on the system based on the state tag value. In some examples, operation 510 can be implemented in a similar manner as operation 410 of FIG. 4.

After operation 510, process flow 500 moves to 512, where process flow 500 ends.

Figure 6:
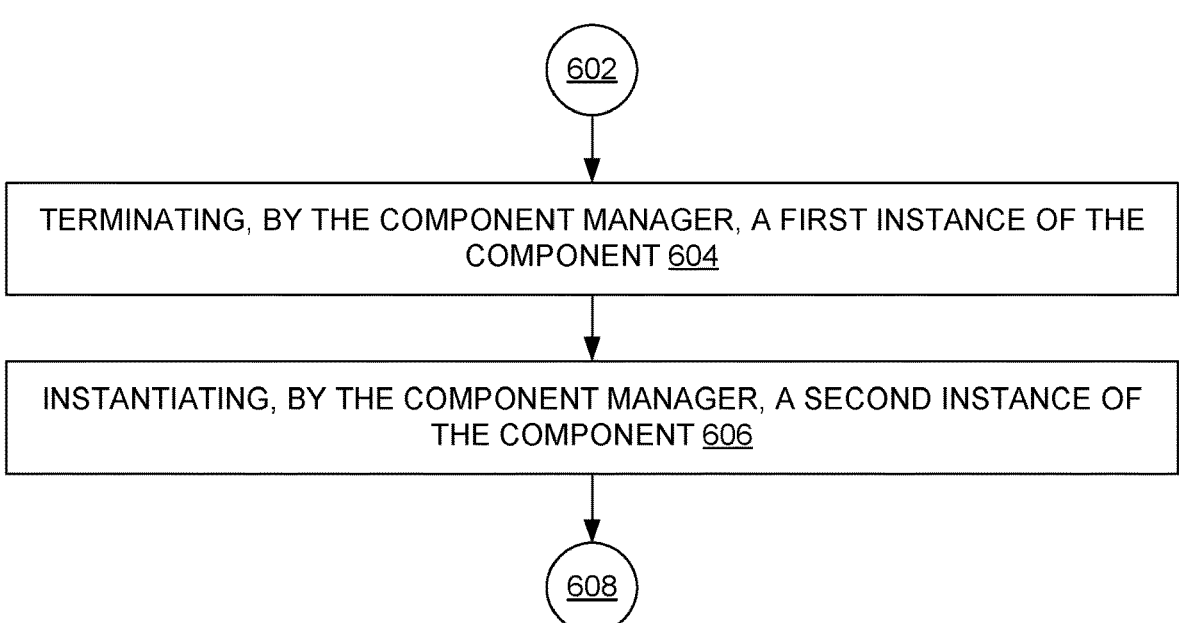
FIG. 6 illustrates another example process flow that can facilitate self-tagging, in accordance with an embodiment of this disclosure.

FIG. 6 illustrates an example process flow 600 that can facilitate self-tagging, in accordance with an embodiment of this disclosure. In some examples, one or more embodiments of process flow 600 can be implemented by self-tagging component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, and/or process flow 1000 of FIG. 10.

In some examples, process flow 600 can be implemented to cause a corrective action to be performed on a component based on a state tag value.

Process flow 600 begins with 602, and moves to operation 604.

Operation 604 depicts terminating, by the component manager, a first instance of the component. That is, a component manager in an underlying system can issue a corrective action, which can include terminating the component.

After operation 604, process flow 600 moves to operation 606.

Operation 606 depicts instantiating, by the component manager, a second instance of the component. That is, a second part of a corrective action can be, after terminating the component, instantiating a new instance of the component. This can have an effect of restarting the component.

After operation 606, process flow 600 moves to operation 608.

FIG. 7 illustrates an example process flow 700 that can facilitate self-tagging, in accordance with an embodiment of this disclosure. In some examples, one or more embodiments of process flow 700 can be implemented by self-tagging component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9, and/or process flow 1000 of FIG. 10.

In some examples, process flow 700 can be implemented to facilitate sending an application programming interface call that identifies changing the state tag value of a component to a tag.

Process flow 700 begins with 702, and moves to operation 704.

Operation 704 depicts sending a first message from the component to a tag command line interface or application programming interface component. This can comprise a communication between exception handler 326 and tag CLI & API 314 of FIG. 3.

After operation 704, process flow 700 moves to operation 706.

Operation 706 depicts sending a second message from the tag command line interface or application programming interface component to a tag syntax checking component. This can comprise a communication from tag CLI & API 314 to tag syntax checker 308 of FIG. 3.

After operation 706, process flow 700 moves to operation 708.

Operation 708 depicts sending a third message from the tag syntax checking component to a tag-object mapping component. This can comprise a communication from tag syntax checker 308 to tag-object mapper 310 of FIG. 3.

After operation 708, process flow 700 moves to operation 710.

Operation 710 depicts sending a fourth message from the tag-object mapping component to a tag-based execution engine. This can comprise a communication from tag-object mapper 310 to tag-based execution engine 304 of FIG. 3.

After operation 710, process flow 700 moves to 712, where process flow 700 ends.

FIG. 8 illustrates an example process flow 800 that can facilitate self-tagging, in accordance with an embodiment of this disclosure. In some examples, one or more embodiments of process flow 800 can be implemented by self-tagging component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, process flow 900 of FIG. 9, and/or process flow 1000 of FIG. 10.

In some examples, process flow 800 can facilitate causing a corrective action to be performed on a system based on the state tag value.

Process flow 800 begins with 802, and moves to operation 804.

Operation 804 depicts determining that the state tag value has changed as stored in a tag-map data store of the tag-based execution engine. This can be tag-map store 306 of FIG. 3.

After operation 804, process flow 800 moves to operation 806.

Operation 806 depicts causing the corrective action to be performed on the component based on the state tag value. That is, updating a tag in operation 804 can trigger component manager in underlying system 320 to initiate tag-based actions.

After operation 806, process flow 800 moves to 808, where process flow 800 ends.

FIG. 9 illustrates an example process flow 900 that can facilitate self-tagging, in accordance with an embodiment of this disclosure. In some examples, one or more embodiments of process flow 900 can be implemented by self-tagging component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts determining, by at least one component, at least one tag that corresponds to an issue with execution of the at least one component. In some examples, operation 904 can be implemented in a similar manner as operation 404 of FIG. 4.

In some examples, the at least one component comprises a first component and a second component, where first tags of the first component are associated with a first tag namespace, and where second tags of the second component are associated with a second tag namespace. That is, in some examples, components can define their own tag namespace, and have the rest of the system recognize the namespace as such, and use it for causing a desired state change in the system.

After operation 904, process flow 900 moves to operation 906.

Operation 906 depicts sending, by the at least one component and to a tagging subsystem, an application programming interface call that identifies changing at least one state tag value of the at least one component to the at least one tag. In some examples, operation 906 can be implemented in a similar manner as operation 406 of FIG. 4.

In some examples, the at least one state tag value comprises at least one self-tag of a group of self-tags, wherein the group of self-tags is managed in a first namespace, and wherein the first namespace differs from a second namespace of system-internal tags or user-defined tags. That is, self-tags can belong to a separate category of tags, separate from system internal tags, or user-defined tags. Self-tags can be managed in a separate namespace, by virtue of that separation.

In some examples, the at least one tag comprises at least one self-tag, wherein the tagging subsystem is configured to process self-tags that comprise the at least one self-tag in a first namespace, wherein the tagging subsystem is configured to process internal tags of the system in a second namespace, and wherein the tagging subsystem is configured to process user-defined tags in a third namespace. That is, self-tags can belong to a separate category of tags, separate from system internal tags, or user-defined tags. Self-tags can be managed in a separate namespace, by virtue of that separation.

After operation 906, process flow 900 moves to operation 908.

Operation 908 depicts causing, by a component manager, at least one corrective action to be performed on the system based on the at least one state tag value. In some examples, operation 908 can be implemented in a similar manner as operation 408 of FIG. 4.

In some examples, the at least one state tag value has at least one expected value, and wherein causing the at least one corrective action to be performed on the system is based on the at least one state tag value differing from the at least one expected value. That is, a system that implements the present techniques can set "watchers" on the self-tags, and initiate remedial actions based on the tag key, its expected values, and/or new values that can be new to the system.

After operation 908, process flow 900 moves to 910, where process flow 900 ends.

FIG. 10 illustrates an example process flow 1000 that can facilitate self-tagging, in accordance with an embodiment of this disclosure. In some examples, one or more embodiments of process flow 1000 can be implemented by self-tagging component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 900 of FIG. 9.

Where process flow 1000 is implemented in conjunction with process flow 900 of FIG. 9, it can be that the at least one state tag value comprises a first state tag value, and the at least one component comprises a first component.

Process flow 1000 begins with 1002, and moves to operation 1004.

Operation 1004 depicts changing the first state tag value of the first component to the at least one tag, or changing a second state tag value of a third component of the at least one component.

After operation 1004, process flow 1000 moves to operation 1006.

Operation 1006 depicts performing at least one action on a second component of the at least one component based on changing the first state tag value of the first component to the at least one tag, or based on changing a second state tag value of a third component of the at least one component.

After operation 1006, process flow 1000 moves to 1008, where process flow 1000 ends.

In process flow 1000, there can be an existing system tag. The behavior of one component can change when actions based on that tag are initiated—from default. In other examples, there can be a tag that was created by another component. That tag can be used by a different component, and a new behavior for this different component can be defined to become part of a new pool of function.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of computer system 102.

In some examples, computing environment 1100 can implement one or more embodiments of the process flows of FIGS. 4-10 to facilitate self-tagging.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 (containing disk 1122) can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
a component;
a component manager;
at least one processor; and
at least one memory that stores executable instructions that, when executed by the at least one processor, facilitate performance of operations, comprising:
  determining, by the component, an issue with execution of the component that is internal to the component;
  determining, by the component, a tag that corresponds to the issue;
  sending, by the component and to a tagging subsystem of the system, an application programming interface call that identifies changing a state tag value of the component to the tag, wherein the tagging subsystem is configured to store statuses for a group of components that comprises the component, and comprising,
    sending a first message from the component to a tag command line interface or an application programming interface component;
    sending a second message from the tag command line interface or the application programming interface component to a tag syntax checking component;
    sending a third message from the tag syntax checking component to a tag-object mapping component; and
    sending a fourth message from the tag-object mapping component to a tag-based execution engine of the tagging subsystem; and issuing, by the component manager, an action applicable to the system based on the state tag value.

2. The system of claim 1, wherein the component comprises a pod, a container, a virtual machine, a host operating system, a volume, a file system, an object storage bucket, a computer hardware, or a storage array.

3. The system of claim 1, wherein the determining of the tag is performed independently of the tagging subsystem.

4. The system of claim 1, wherein the tag is defined based on tag data that is provided by a developer of the component.

5. The system of claim 1, wherein the determining of the tag is performed based on dynamic runtime knowledge of the component that is available to the component and that is unavailable to the tagging subsystem.

6. The system of claim 1, wherein the determining of the tag is performed based on state information of the component that is available to the component and that is unavailable to the tagging subsystem.

7. The system of claim 1, wherein the component comprises a stored procedure, and wherein issuing the action comprises the component manager invoking the stored procedure for the component.

8. The system of claim 7, wherein invoking the stored procedure comprises the stored procedure utilizing runtime values of the component.

9. A method, comprising:
determining, by a component of a system comprising at least one processor, an issue with execution of the component that is internal to the component;
determining, by the component, a tag that corresponds to the issue;
sending, by the component and to a tagging subsystem of the system, an application programming interface call that identifies changing a state tag value of the component to the tag, wherein the tagging subsystem is configured to store statuses for a group of components that comprises the component, and comprising,
  sending a first message from the component to a tag command line interface or an application programming interface component;
  sending a second message from the tag command line interface or the application programming interface component to a tag syntax checking component;
  sending a third message from the tag syntax checking component to a tag-object mapping component; and
  sending a fourth message from the tag-object mapping component to a tag-based execution engine of the tagging subsystem; and
causing, by a component manager of the system, an action to be performed on the system based on the state tag value.

10. The method of claim 9, wherein the application programming interface call adheres to a representational state transfer format, or a protocol buffer format.

11. The method of claim 9, wherein causing the action to be performed on the system based on the state tag value comprises:
terminating, by the component manager, a first instance of the component; and
instantiating, by the component manager, a second instance of the component.

12. The method of claim 9, wherein the issue with the execution of the component comprises an exception.

13. The method of claim 9, wherein causing the action to be performed based on the state tag value comprises: determining that the state tag value has changed as stored in a tag-map data store of the tag-based execution engine.

14. A non-transitory computer-readable medium comprising instructions that, in response to execution, cause a system comprising at least one component, a component manager, and at least one processor to perform operations, comprising:

determining, by the at least one component, at least one tag that corresponds to an issue with execution of the at least one component that is internal to the component;

sending, by the at least one component and to a tagging subsystem, an application programming interface call that identifies changing at least one state tag value of the at least one component to the at least one tag, wherein the tagging subsystem is configured to store statuses for a group of components that comprises the component, and comprising, sending a first message from the component to a tag command line interface or an application programming interface component;

sending a second message from the tag command line interface or the application programming interface component to a tag syntax checking component;

sending a third message from the tag syntax checking component to a tag-object mapping component; and sending a fourth message from the tag-object mapping component to a tag-based execution engine of the tagging subsystem; and causing, by the component manager, at least one action to be performed on the system based on the at least one state tag value.

15. The non-transitory computer-readable medium of claim 14, wherein the at least one state tag value comprises at least one self-tag of a group of self-tags, wherein the group of self-tags is managed in a first namespace, and wherein the first namespace differs from a second namespace of system-internal tags or user-defined tags.

16. The non-transitory computer-readable medium of claim 14, wherein the at least one component comprises a first component and a second component, wherein first tags of the first component are associated with a first tag namespace, and wherein second tags of the second component are associated with a second tag namespace.

17. The non-transitory computer-readable medium of claim 14, wherein the at least one tag comprises at least one self-tag, wherein the tagging subsystem is configured to process self-tags that comprise the at least one self-tag in a first namespace, wherein the tagging subsystem is configured to process internal tags of the system in a second namespace, and wherein the tagging subsystem is configured to process user-defined tags in a third namespace.

18. The non-transitory computer-readable medium of claim 14, wherein the at least one state tag value comprises a first state tag value, wherein the at least one component comprises a first component, and wherein the operations further comprise:

performing at least one action on a second component of the at least one component based on changing the first state tag value of the first component to the at least one tag, or based on changing a second state tag value of a third component of the at least one component.

19. The non-transitory computer-readable medium of claim 14, wherein the at least one state tag value has at least one expected value, and wherein causing the at least one action to be performed on the system is based on the at least one state tag value differing from the at least one expected value.

20. The non-transitory computer-readable medium of claim 14, wherein the component comprises a stored procedure of a relational database, wherein issuing the action comprises the component manager invoking the stored procedure for the component, and wherein the invoking of the stored procedure comprises the stored procedure utilizing a runtime value of the component as a parameter of the stored procedure.

\* \* \* \* \*